United States Patent [19]

Jostein

[11] Patent Number: 5,788,288
[45] Date of Patent: Aug. 4, 1998

[54] SEALING ARRANGEMENT

[75] Inventor: Erstad Jostein, Bergen, Norway

[73] Assignee: Framo Engineering AS, Nesttun, Norway

[21] Appl. No.: 559,356

[22] Filed: Nov. 16, 1995

[30] Foreign Application Priority Data

Nov. 1, 1995 [GB] United Kingdom .......... 9522326

[51] Int. Cl.$^6$ .......................................... F16L 35/00
[52] U.S. Cl. .......................... 285/93; 285/98; 285/106; 285/121.3; 285/281; 285/420
[58] Field of Search ........................ 285/136, 95, 98, 285/111, 96, 106, 281, 93, 121.3, 420

[56] References Cited

U.S. PATENT DOCUMENTS

| | | |
|---|---|---|
| 3,351,360 | 11/1967 | Faccou .................. 285/136 X |
| 3,884,511 | 5/1975 | Hermonson ............ 285/98 X |
| 4,462,619 | 7/1984 | Hotger .................. 285/98 X |
| 4,647,076 | 3/1987 | Pollack et al. . |
| 4,647,077 | 3/1987 | Ethridge et al. . |
| 4,669,758 | 6/1987 | Feller et al. ........... 285/136 X |
| 4,819,966 | 4/1989 | Gibb ..................... 285/136 X |
| 4,828,292 | 5/1989 | Jansen .................. 285/136 X |
| 5,052,720 | 10/1991 | Yoda .................... 285/98 X |
| 5,411,298 | 5/1995 | Pollack ................. 285/106 X |
| 5,456,286 | 10/1995 | Warner et al. . |

FOREIGN PATENT DOCUMENTS

| | | |
|---|---|---|
| 2562201 | 10/1985 | France . |
| 2124720 | 2/1984 | United Kingdom . |

*Primary Examiner*—Dave W. Arola
*Attorney, Agent, or Firm*—Foley & Lardner

[57] ABSTRACT

A dynamic sealing arrangement for connectors carrying high pressure fluids such as are used in the oil and gas industry for transferring production fluids from drilling installations to transport vessels. The sealing arrangement comprises a primary and a secondary U-shaped hydraulically operated sealing ring with open sides facing away from the junction of the connectors in the direction of the fluid leakage path. Barrier fluid under a pressure higher than that of the production fluid is supplied to the chamber between the sealing rings and independently to the open side of the secondary seal. The primary seal thus experiences a pressure differential and is activated. The secondary seal experiences a pressure differential and is activated only if the primary seal fails. Thus the secondary seal does not wear under normal usage of the connectors and is brought into operation automatically, efficiently and without delay when the primary seal is damaged. Substantial cost savings are achieved.

16 Claims, 2 Drawing Sheets

SEALING ARRANGEMENT

FIELD OF THE INVENTION

The present invention relates to a sealing arrangement and particularly to a sealing arrangement for conduits conveying fluid between two relatively moveable members.

Such a sealing arrangement is often referred to as a dynamic seal. It has particular applications in the transfer of oil and gas from offshore drilling installations such as from offshore pipelines into transport vessels. Connectors for such fluid transfer are required to allow relative motion such as swivelling and rotating so as to allow for the influence of weather conditions, such as strong winds as well as waves and water currents, on the pipeline and on the vessel.

A dynamic seal of this sort may be required for example in a floating buoy supporting a subsea oil or gas riser, or on the deck of a transport vessel, e.g. an oil tanker.

REFERENCE TO COPENDING APPLICATIONS

Reference is hereby made to applicant's own copending applications covering related subject matter the content of which is incorporated herein by reference:

US application claiming priority from UK application 9522325.1 filed 1 Nov. 1995 entitled "Fluid Flow Connector" (agent's reference FD38/PL77263GB).

US application claiming priority from UK application 9522327.7 filed 1 Nov. 1995 entitled "High Pressure Fluid Flow Connector" (agent's reference FD39/PL77264GB).

US Application claiming priority from UK application 9522340.0 filed 1 Nov. 1995 entitled "Monitoring System for High Pressure Fluid Flow Connector" (agent's reference FD40/PL77265GB).

BACKGROUND OF THE INVENTION

A dynamic sealing arrangement is known from PCT application number PCT/NO94/00120 by Den norske stats oljeselskap a.s. et al which describes a rotatable swivel turret for connecting oil or gas pipelines in a manner in which they can readily be disconnected and reconnected without affecting the integrity of the seal at the joint.

This known sealing arrangement uses a dynamic seal comprising a sealing ring of U-shaped cross section seated in a channel in one of the relatively rotatable swivel members and pressurised by a barrier fluid at a pressure higher than the pressure of the oil or gas against which the sealing is to be effected.

However, known designs of dynamic seals can experience heavy wear and frequent failure. The apparatus in which these seals are required to operate is large scale, heavy engineering with close tolerances, and a slight misalignment between components can cause severe and sudden damage to the sealing material and consequent failure of the seal. Such a failure can have severe repercussions since it can result in oil spills and environmental damage and in any case requires the apparatus to be shut down while repairs are effected, which is an expensive and inconvenient procedure.

The present invention aims to provide an improved sealing arrangement in which these disadvantages are substantially obviated.

SUMMARY OF THE INVENTION

Accordingly the present invention provides a sealing arrangement for use at the junction of two relatively moveable members which define fluid communicating conduits for the transference of high pressure production fluid across the junction, the moveable members having respective facing surfaces defining therebetween a potential leakage path for the production fluid, the sealing arrangement comprising:

a primary hydraulic seal having two sides a secondary hydraulic seal having two sides and being spaced from the primary seal within said potential leakage path between the respective relatively moveable members, a chamber formed between opposing sides of the primary and secondary seals, means for supplying a barrier fluid under a first pressure to said chamber, and means for supplying a barrier fluid under a second pressure to the other side of the secondary seal, wherein the first and second barrier fluid pressures are approximately equal so that the secondary seal does not experience an activating pressure differential under normal working conditions, and the first and second barrier fluid pressures are higher than the pressure of the production fluid to be sealed.

The fluid to be sealed may be liquid, for example oil, or may be a gas.

Preferably the supply of barrier fluids is arranged such that failure of the primary seal causes a pressure differential across the secondary seal and thus activates the secondary seal against leakage of the high pressure fluid flowing across the junction.

In a preferred embodiment at least one of the seals comprises a sealing member with a U-shaped cross-section seated in a channel in one of the facing surfaces of the moveable members.

It can be seen that the unique design of the present invention provides for a secondary seal which, under normal conditions, does not experience any wear since it does not actively seal unless the primary seal fails. When the primary seal does fail then the secondary seal is automatically and instantaneously brought into action and no failure of the joint will occur. Repair of the primary seal can thus be delayed until a routine service is scheduled or until the weather conditions permit. With previous systems, a seal failure required immediate shut down of the system and immediate replacement with the evident higher attendant costs.

In a practical situation, many such dynamic seals are in use in a swivel turret or other such connection arrangement between conduits: for example a stack of modules or segments with conduits carrying oil, gas and coolant may be used. Hence a particular preferred embodiment provides means to identify which seal has failed so that the failed primary sealing unit can be relatively easily and cheaply replaced at the next routine service. A suitable monitoring system is described in applicant's co-pending and simultaneously filed US Application deriving from UK application no. 9522340.0 entitled "Monitoring System for High Pressure Fluid Connector" (agent's reference: FD40/PL77265GB).

The sealing arrangement of this invention can be used in a fluid connector such as is described in applicant's copending and simultaneously filed US applications derived from UK application no. 9522325.1 entitled "Fluid Flow Connector" (agent's reference FD38/PL77263GB) and from UK application no. 9522327.7 entitled "High Pressure Fluid Flow Connector" (agent's reference FD39/PL77264GB).

DETAILED DESCRIPTION

Figure 1:
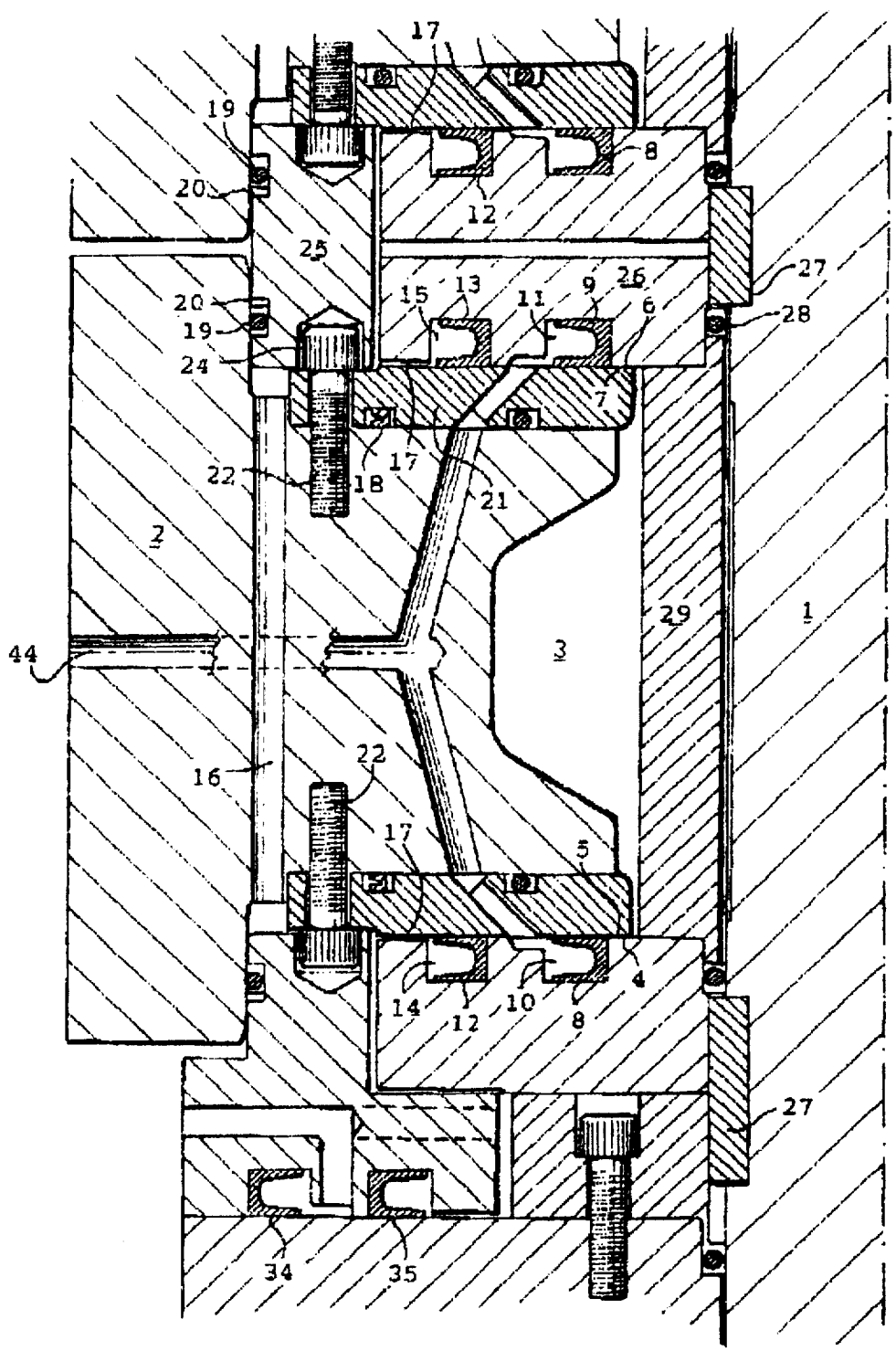
FIG. 1 illustrates in cross-section a sealing arrangement according to the present invention.

FIG. 1 illustrates a joint between fluid conduits. The conduits are joined so as to allow a relative rotation of parts at the joint and for ease of reference those parts which move relative to each other are denoted by oppositely directed cross-hatching. In the specific embodiment shown in FIG. 1, a core swivel member 1, denoted by left to right rising cross-hatching is a stationary male member whereas the connecting member 2, denoted by left to right falling cross-hatching is a female member which is rotatable about member 1. Axial bores (shown in FIG. 2) in male member 1 are connected via radial passages (shown in FIG. 2) to annular grooves 3 forming a junction of the male and female members 1 and 2. These annular grooves 3 connect with passageways (shown in FIG. 2) in the female member 2 so that fluid such as oil or gas can be transferred, for example from an oil pipeline riser to a transport vessel such as an oil tanker.

In the embodiment shown in FIG. 1, surfaces which are moveable relative to each other are indicated by the junction of opposite cross-hatching. Hence the surfaces 4 and 6 of male member 1 move relative to the surfaces 5 and 7 respectively of female member 2. In order to allow for relative rotation of the members 1 and 2, there must be a small clearance between these relatively moveable surfaces and this provides a potential fluid leakage path for the production fluid from the conduits and in particular from the annular groove 3.

Thus, a sealing arrangement is incorporated to seal this small clearance gap. In particular a pair of primary lip seals 8, 9 with U-shaped cross sections are arranged in respective channels 10, 11 above and below the annular groove 3. These primary seals are pressurised by a barrier fluid supplied via a supply channel 44 in female member 2. The supply channel branches to provide barrier fluid into each of the grooves 10, 11 to pressurise the primary seals 8, 9. The barrier fluid through channel 44 is supplied at a pressure slightly above the pressure of the production fluid in the annular channel 3 and thus the arms of each of the U-shaped sealing rings 8, 9 are forced against respective relatively moveable surfaces and retain the production fluid within groove 3.

Typically the pressure of the production fluid, e.g. gas or oil, may be of the order of 500 bar and the barrier fluid would preferably be under a pressure of around 520 bar. These values are given by way of example only and are in no way intended to be limiting on the pressure which could be used in a sealing arrangement according to the present invention which would be chosen by a person skilled in the art according to the particular circumstances and requirements of the apparatus.

To improve the efficiency of the seal, at least one of each adjoining surface (4/5 or 6/7) is coated with a hard smooth coating such as tungsten carbide. In practice it is easier to provide such a coating onto a predominantly flat surface and thus in the embodiment illustrated this coating would be on surfaces 5 and 7. The material of the sealing rings 8, 9 is preferably a plastics material thus providing a relatively soft member to seal against the hard smooth surface of tungsten carbide to provide an efficient seal.

The barrier fluid in channel 44, and in grooves 10, 11, is at a higher pressure to the production fluid against which sealing is being effected, so any net flow will be from the barrier fluid channel into the production fluid conduit. Thus in practice the barrier fluid effectively lubricates the sealing rings 8, 9 and facilitates the relative movement between the sliding surfaces. An extremely small net fluid loss of the barrier fluid will be experienced but this is insignificant compared to the many millions of gallons of product which would usually flow through the conduits across the joint, and is of course preferable to leakage in the opposite direction which would happen if the primary seal were not an overpressure seal.

A secondary seal for the joint is provided in the form of secondary sealing rings 12 and 13 seated in channels 14 and 15 of surfaces 4 and 6 respectively.

These secondary channels 14 and 15 are spaced from the primary channels 10 and 11 and are also provided with a barrier fluid under pressure via supply channel 16 located within the female member 2. The barrier fluid for the secondary seals 12 and 13 forms part of a separate supply circuit to that for the primary seals 8 and 9 and thus channel 16 is not connected to channel 44. However the barrier fluid for the secondary sealing rings 12 and 13 is supplied at the same pressure as the barrier fluid for the primary sealing rings 8 and 9. Therefore the same barrier fluid pressure is applied to both sides of each of the secondary sealing rings 12 and 13 then the secondary sealing rings are not activated under normal usage conditions (ie when the primary sealing rings are intact).

In the embodiment shown a bearing is provided between relatively rotatable surfaces 6, 7 and 4, 5 respectively. This may be a sliding or needle bearing as shown at 17 in FIG. 1 or alteratively a roller bearing.

In the embodiment of FIG. 1 several static seals are also shown. These are provided to lock various parts or elements together and may comprise U-shaped cross-sectional seals as denoted by 18 or O-ring seals 19 with back-up plates 20.

The back-up plate in the O-ring seals 19 prevents extrusion of the seal through the gap between the surfaces being sealed, which otherwise does tend to occur under high pressure.

The U-shaped static seals 18 are provided in grooves in a sealing surface element 21 to hold it to the main body of female member 2. Bolts 22 are also arranged to hold these elements together. The heads of the bolts sit in recesses 24 in a connecting member 25 which serves to fasten this segment of female member 2 to an adjacent similar segment.

The connecting member 25 is further attached to the female member by static seals formed of O-rings 19 and back-up plates 20.

The primary and secondary sealing ring channels are formed in an intermediate member 26 which is fixed to the male member 1 by means of a key 27 and static seals 28.

A distance ring surrounds the male member 1. In a practical situation the arrangement of FIG. 1 would be repeated in a stack of modules, which for example may carry fluids of different types, or of different pressures or carry fluids in different directions. The distance ring 29 has shoulders which abut adjacent corners of the intermediate members 26 to take the compression forces holding the stacked segments or modules together.

Figure 2:
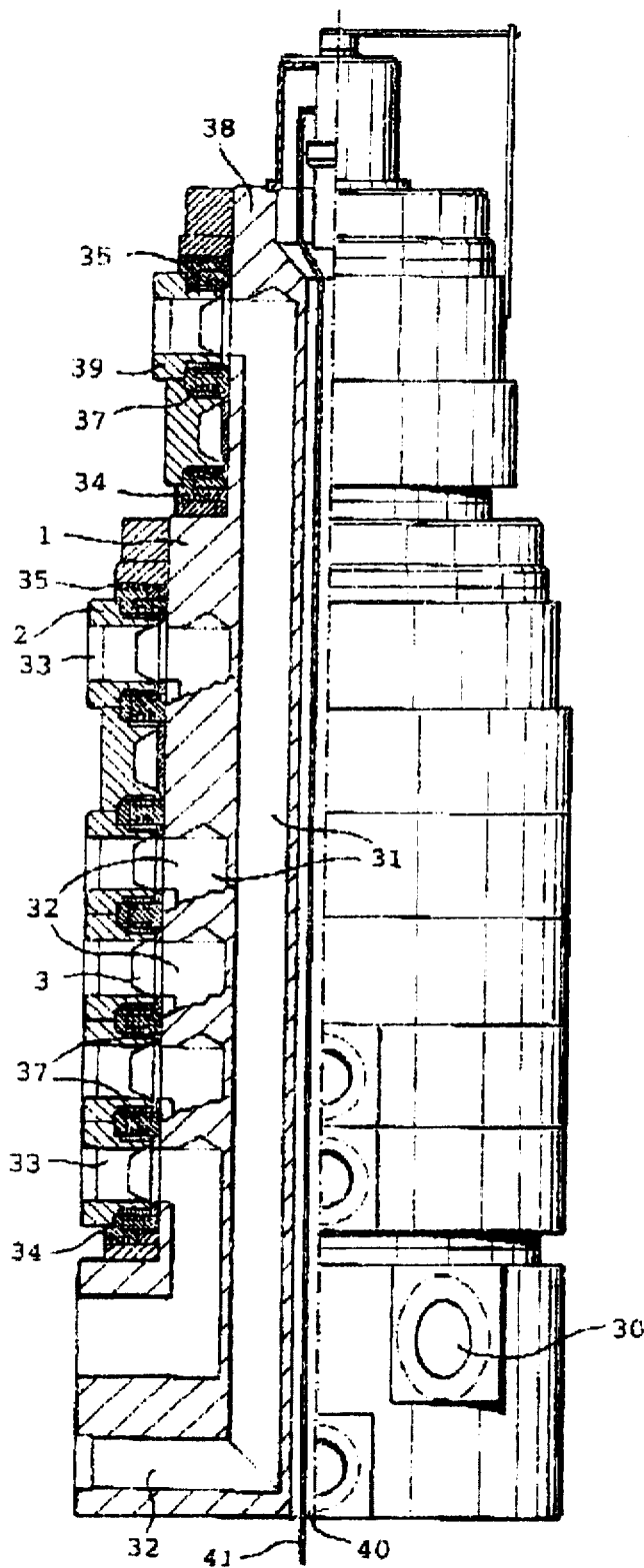
FIG. 2 illustrates a high pressure fluid connector incorporating a sealing arrangement according to the present invention, in split cross-sectional and elevational views.

Such a stack of modules is shown in FIG. 2. FIG. 2 shows clearly the inlet/outlet ports 30 and how the parts communicate via axial bores 31 and passageways 32 in the male member 1 with fluid conduits 33 in the female member 2.

The junction of each conduit between female member 2 and male member 1 is sealed by double pairs of sealing rings, arranged circumferentially of the male member 1. As shown and described in more detail with reference to FIG. 1, the primary pair of sealing rings 8 and 9 are located above and below each fluid conduit, as are also the secondary pair of sealing rings. The secondary pair of sealing rings are spaced hydraulically outwardly from the primary sealing rings, i.e. spaced further from the flow path of the production fluid. In the embodiment shown, this is outwardly in the radial direction.

In addition there are environment seals 34 and 35 at the bottom and the top of the stack of modules shown in FIG. 2. These comprise a pair of spaced U-shaped sealing rings which seal the relatively rotatable surfaces at the top and bottom of the apparatus respectively from the external environment, which will generally be at atmospheric pressure.

These environment seals also comprise a pair of lip-seals having substantially U-shaped cross-sections and they are located in spaced grooves in one of the relatively rotatable surfaces. A barrier fluid under pressure is supplied to the open sides of each of these seals and typically the barrier fluid would be supplied at the same pressure as the barrier fluid for the primary and secondary joint seals. The environment seals operate in the same way as the dynamic seals but this time they are sealing against atmospheric pressure and therefore in the embodiment illustrated the outer seal 34 is effectively the operative primary seal. The barrier fluid pressure here will be substantially more than the environmental pressure (when this is atmospheric pressure) and this provides a very effective seal for this application. Nonetheless a secondary seal 35 is provided of substantially similar design and the secondary barrier fluid is supplied to this secondary seal at the same pressure as the primary barrier fluid. Because the same pressure is applied to both sides of the secondary environment seal 35 then this secondary seal will again not be operable until or unless the primary seal fails.

When the primary seal does fail, there will be a leakage path for barrier fluid from the primary seal to escape to the atmosphere but the drop in pressure across the primary seal causes a pressure differential across the secondary seal 35 and activates the secondary seal.

This environment seal provides an ultimate level of protection against product leakage from the production fluid conduits. Before the environment seal is needed, both the primary and secondary seals would need to fail in the segment or module at the top or bottom of the stack. Nonetheless, it is of course vitally important that a production fluid such as oil does not leak into the environment.

What I claim is:

1. A sealing arrangement comprising:

a male member having a first surface;

a female member having a second surface, the female member cooperatively receiving and retaining said male member and being relatively rotatable with respect to the male member, the second surface confronting and being relatively movable with respect to the first surface;

a gap separating the first and second surfaces, the gap having a relatively wide recessed region forming a fluid conduit for high pressure production fluid and a relatively narrow non-recessed region forming a leakage path for production fluid, the non-recessed region being adjacent to and bounding the recessed region;

a primary hydraulic seal and a secondary hydraulic seal being located in the relatively narrow non-recessed region of the gap for preventing production fluid leakage from the fluid conduit through the leakage path, the primary and secondary hydraulic seals being spaced apart from each other along the leakage path and forming a chamber therebetween;

a barrier fluid being supplied on opposite sides of the secondary seal and filling the chamber between the primary and secondary seals; and a pressure source for supplying the barrier fluid at a relatively higher pressure than that of the Production fluid in the fluid conduit;

wherein the primary and secondary seals each have a U-shaped cross-section opening in a direction along the leakage path and away from the fluid conduit.

2. The sealing arrangement of claim 1, wherein the pressure source includes a first pressure source for supplying the barrier fluid to the open side of the secondary seal and a second pressure source for supplying the barrier fluid to the chamber between the seals, whereby failure of the primary seal causes the barrier fluid in the chamber between the seals to flow into the fluid conduit and causes a pressure differential across the secondary seal activating said secondary seal to seal against leakage of the high pressure production fluid through the leakage path.

3. The sealing arrangement of claim 1 or 2, further comprising:

a groove in one of the first and second surfaces wherein at least one of the primary and secondary hydraulic seals is seated in the groove.

4. The sealing arrangement of claim 3, wherein one of the relatively moveable members is held stationary and the other is permitted to move, and the groove is formed in the surface of the moveable member.

5. The sealing arrangement of claim 3, wherein one of the relatively moveable members is held stationary and the other is permitted to move, and the groove is formed in the surface of the stationary member.

6. The sealing arrangement of claim 1, wherein said fluid conduit between said members comprises an annular channel and said primary seal comprises two ring elements, axially spaced, one on each side of the annular channel.

7. The sealing arrangement of claim 6, wherein the two ring elements have approximately the same diameter.

8. The sealing arrangement of claim 1 further comprising a bearing arranged between the surfaces of the relatively moveable members.

9. The sealing arrangement of claim 8, wherein the bearing is a sliding friction bearing.

10. The sealing arrangement of claim 8, wherein the bearing is a roller bearing.

11. The sealing arrangement of claim 1 comprising a tungsten carbide coating on one of the surfaces.

12. The sealing arrangement of claim 1, further comprising:

a pressure monitor in the chamber between the primary and secondary seals for sensing chamber pressure; and an indicator connected to the pressure monitor for indicating when the chamber pressure falls.

13. The sealing arrangement of claim 1, further comprising:

at least one environment seal between the relatively rotatable members, each environment seal providing additional sealing from the external environment for the primary and secondary hydraulic seals.

14. The sealing arrangement of claim 1, wherein the pressure source comprises non-return valves.

15. The sealing arrangement of claim 1, wherein the relatively moveable surfaces rotate one with respect to the other.

16. The sealing arrangement of claim 1, wherein the barrier fluid pressure is between 2% and 6% higher than the production fluid pressure.

* * * * *

UNITED STATES PATENT AND TRADEMARK OFFICE
CERTIFICATE OF CORRECTION

PATENT NO. :   5,788,288
DATED      :   August 4, 1998
INVENTOR(S) :  Jostein ERSTAD It is certified that error appears in the above-indentified patent and that said Letters Patent is hereby corrected as shown below:

On the title page; "[75] Erstad Jostein, Bergen, Norway" should read --[75] Jostein Erstad, Bergen, Norway--.

Under item [19], "Jostein" should read --Erstad--.

Signed and Sealed this

Twenty-fourth Day of August, 1999

*Attest:*

Q. TODD DICKINSON

*Attesting Officer*    *Acting Commissioner of Patents and Trademarks*